2,912,396
PREPARATION OF DRYING OIL BY MODIFICATION AND COPOLYMERIZATION OF SOY BEAN OIL WITH A VINYL MONOMER

Alexander Schwarcman, Buffalo, N.Y., assignor to Spencer Kellogg and Sons, Inc., Buffalo, N.Y.

No Drawing. Application August 18, 1954
Serial No. 450,781

2 Claims. (Cl. 260—22)

The present invention relates to an improved film-forming oil composition and to the method of manufacturing the same by reacting a modified semi-drying oil with a vinyl monomer.

Heretofore, film-forming oil compositions have been produced from the drying oils by copolymerizing them with a material which has been variously called monomethyl styrene or vinyltoluene. The resultant copolymerized composition obtained by heating substantially equal parts of the drying oil and the vinyltoluene in the presence of a suitable catalyst produces a product which is capable of producing films of excellent hardness and water resistance. However, such films, since they are produced from the drying oils, as exemplified by linseed oil, yellow with age.

Under present economic conditions, the best example of a semi-drying oil, that is soybean oil, may be marketed at a price somewhat lower than that of linseed oil, as an economic advantage may flow from the employment of soybean oil in a similar reaction. However, when vinyltoluene or vinyltoluene mixed with divinylbenzene is copolymerized with a semi-drying oil, such as soybean oil, in attempts to improve the character of that oil in the manner used with the linseed oil, an end product is obtained which does not produce satisfactory films, either from the point of view of hardness or water and alkali resistance.

It is an object of the present invention to make possible the production of a film-forming composition from soybean oil and vinyltoluene.

It is also an object of the invention to make possible the production of excellent film-forming products by the copolymerization of vinyltoluene with modified semi-drying oils.

It is also an object of the invention to produce from semi-drying oils, partially alcoholized with polyhydric alcohols and esterified with a polybasic organic acid, a copolymerized material with vinyltoluene.

Whereas the drying oils, as for instance linseed oil, are high in glyceride of linolenic acid and possess a relatively high iodine number on the order of 180, the so-called semi-drying oils, as for instance safflower oil, soybean oil, sesame oil, sunflower oil and cottonseed oil, among others, possess relatively large proportions of di-ethanoid fatty acid glyceride esters and, therefore, possess relatively lower iodine numbers.

The very large production of the prominent semi-drying oil, soybean oil, has brought about a price situation wherein this oil often sells at a price less than that of linseed oil so that it is economically advantageous to produce from soybean oil, as an initial raw product, film-forming oils that can be used as a basis for the preparation of paints and other protective coatings.

In accordance with the present invention, it is possible to prepare from the semi-drying oils, as particularly exemplified by soybean oil, film-forming oil compositions which may be reduced with suitable solvents and which may form the basis for the production of protective coatings, such as paints, which coatings produce very high grade, hard films, resistant to water and mild alkali and which are most importantly, in contrast to products produced from linseed oil, nonyellowing with age.

In accordance, therefore, with the present invention, a semi-drying oil and particularly the pre-eminent member of that class—soybean oil— is first modified as hereinafter described and then copolymerized in the presence of a suitable catalyst, such as a small amount of an organic peroxide, with a vinyl monomer.

The semi-drying oil is modified first by partial alcoholysis with a polyhydric alcohol, preferably a polyhydric alcohol, such as penta-erythritol.

The partially alcoholized oil is then esterified by reacting the same with a polybasic acid. The preferred polybasic acid is maleic acid. This esterification is performed in the well known manner and the resulting product is designated herein as modified semi-drying oil. The modification process is described in U.S. Letters Patent of Alexander Schwarcman No. 2,412,177, issued December 3, 1946 wherein the oil is heated at a temperature of from 400° F. to 500° F. with from 1 to 7% on the weight of the oil of a polyhydric alcohol and with a like amount of polybasic acid at a temperature above about 500° F. to produce a drying oil of low acid number.

The exceptional film-forming product of the present invention is produced by copolymerizing the modified semi-drying oil as herein defined, with vinyltoluene. This copolymerization is preferably induced by heating approximately equal parts by weight of modified semi-drying oil and vinyltoluene at a temperature sufficient to cause the desired degree of copolymerization, generally at about 300 to 500° F. for several hours, the vinyl monomers being added slowly to the modified semi-drying oil in the presence of a small amount of an organic peroxide as a catalyst for inducing the copolymerization. The heating and copolymerization reaction is conducted until the end product possesses the desired viscosity and is free of volatile constituents; that is to say, unreacted vinyl compounds. The viscous copolymerized end product may then be reduced with usual solvents and, if desired, compounded with dyes or pigments giving a resultant end composition which forms excellent films which are hard, nontacky, nonyellowing and which resist water and mild alkali.

The following examples are given merely as illustrative of the principles of the invention and are not to be deemed as limitative thereof.

*Example 1.—(Preparation of treated soybean oil)*

A modified soybean oil was prepared by the process of U.S. Patent 2,412,177, issued December 3, 1946, to A. Schwarcman as follows:

1,000 grams of soybean oil and 29 grams of commercial penta-erythritol were heated to 250° F. under agitation and 0.3 gram of litharge added. Heating was continued to 480° F. and the mixture alcoholized 2 hours at this temperature. The alcoholysis product was cooled and 36 grams of maleic anhydride added. Heat was again applied and the temperature raised to 460–470° F. and held until the Gardner-Holdt viscosity was about G—I; the acid number 10–15. At this point the temperature was raised to about 565° F. and the product polymerized to a finished Gardner-Holdt viscosity of Y—Z and an acid number of 6–8.

Alternately, a chemically modified soybean oil of somewhat different chemical composition but having similar physical properties can be prepared by first reacting the soybean oil with the maleic anhydride and subsequently esterifying with a polyhydric alcohol. This product can also be used in the examples given below with equivalent results.

Such treated soybean oils are exemplary of those which may be employed in the present invention. Gardner-Holdt viscosities of from about H to about Z2 may be employed; in general, the treated oils of lower viscosity require larger quantities of vinyltoluene and vinyltoluene containing divinyl-benzene to attain the desired viscosity and other characteristics in the subsequent examples illustrating the preparation of copolymers.

Example 2

52.5 parts of chemically modified soybean oil of Y—Z viscosity prepared in accordance with the method of Example 1 was taken in a three-neck flask equipped with an agitator, a thermometer, a reflux condenser, inert gas inlet, and a dropping funnel, by means of which the monomers can be introduced. 46.5 parts of vinyltoluene and 1 part of technical divinylbenzene were mixed, and 1% cumene hydroperoxide based on the combined weight of the monomers added; this mixture was placed in the dropping funnel. The oil was heated to 355° F. and the dropwise addition of monomers begun; the vinyltoluene-divinylbenzene mixture was added to the modified soybean oil over a two hour period while maintaining the temperature at 355° F. At the end of the addition period the reaction temperature was raised to 465° F. and held for three hours. The product was cooled to about 400° F. and a sufficient amount of low odor type mineral spirits (Kauri Butanol value about 32) added to adjust the nonvolatile content of the solution to 60%. The resulting product was a light straw colored liquid (Gardner color 6—) having a viscosity of Z+.

Example 3

55 parts of the modified soybean oil of Example 1 and 8 parts of mineral spirits were heated to 370° F. and a mixture of 42 parts vinyltoluene and 3 parts of technical divinylbenzene containing 1.5% by weight of cumene hydroperoxide on the mixture added over a two hour period. The temperature was maintained at 370° F. for an additional three hours. The resulting copolymer was thinned with additional mineral spirits to a nonvolatile content of 60% at which point the viscosity was Z3 Gardner-Holdt.

Example 4

52.5 parts of a chemically modified soybean oil prepared in accordance with Example 1 but polymerized to Z2 viscosity were taken and approximately 8 parts of low odor mineral spirits added; the mixture was heated to 375° F. At this temperature 47.5 parts of vinyltoluene (containing 2% by weight of cumene hydroperoxide as a catalyst) were added over a four hour period. The temperature was then raised to 465° F. and held for two hours. The resulting copolymer, when thinned to 60% nonvolatile content in low odor mineral spirits, had a Gardner-Holdt viscosity of X and a color of 7— Gardner.

Example 5

40 parts of the chemically modified soybean oil of Example 1 were heated to 355° F. and 60 parts of vinyltoluene containing 1% by weight of cumene hydroperoxide catalyst added over a two hour period. The temperature was raised to 460° F. for an additional two hours to finish off the copolymer. The copolymer was thinned to 62% nonvolatile content with mineral spirits and yielded a viscosity of Z2+.

Example 6

750 grams of the chemically modified soybean oil of Example 1 were heated to 355° F. and a mixture comprising 750 grams of vinyltoluene and 7.5 grams of cumene hydroperoxide added at this temperature over a two hour period. The temperature was then raised to 460° F. and the copolymerization continued at this temperature for three hours. The copolymer was cooled to 400° F. and 900 grams of mineral spirits added, yielding a vehicle at 62% nonvolatile having a light color and a viscosity of Y on the Gardner-Holdt scale.

Example 7

52.5 parts of the unpolymerized modified soybean oil of Example 1 (viscosity H on the Gardner-Holdt scale) were heated to 370° F. and a mixture of 40.5 parts vinyltoluene and 7.0 parts divinylbenzene containing 1% peroxide catalyst added over a two hour period. After an additional holding period the copolymer was reduced to 60% solids in low odor mineral spirits, resulting in a vehicle having a viscosity of X.

In the foregoing examples, other organic peroxide catalysts e.g. ditertiary butyl peroxide may be substituted for the cumene hydroperoxide with substantially equivalent results.

All of the modified soybean oil copolymers prepared by the methods of Examples 2–7 had excellent film properties. Drying times were very short, ranging up to about 2–4 hours. All films had good hardness at 72 hours, and showed outstanding waterproofness. Chemical resistance as gauged by alkali and solvent resistance was also good.

On the other hand, copolymers prepared using ordinary soybean oil, whether heat bodied or not, have very poor drying and film properties unless the oil content is lowered to 40% or less, and in this event the products are extremely brittle. This latter characteristic is, of course, a serious deficiency for most surface coating applications.

In order to demonstrate the characteristics of vinyltoluene copolymers with ordinary soybean oil the following were prepared:

Example 8

| Oil modification | Monomer | | Peroxide catalyst, pints | Percent N. V. | Viscosity |
|---|---|---|---|---|---|
| | Vinyl-toluene, pints | Divinyl-benzene, pints | | | |
| (8a)___ 50 parts refined soy oil_____ | 50 | _____ | 1 | 85 | Z1 |
| (8b)___ 45 parts bodied soy (Z2)_____ | 55 | _____ | 1 | 60 | T+½ |
| (8c)___ 40 parts bodied soy (Q)_____ | 57 | 3 | 1 | 60 | S |

The procedure used to prepare the copolymers was generally the same as that of Examples 1–7 wherein the chemically modified soybean oils were used, i.e. monomers added over a two hour period at 355–385° F. with an additional three hour polymerization at about 465° F. The properties of these copolymers are further defined below, but it will be noted that copolymer viscosities are significantly lower than those obtained using the chemically modified soybean oils.

Example 9

The film properties of the chemically modified soybean oil copolymers were compared with those obtained from the ordinary soybean oil copolymers. The copolymers of Examples 2 and 4 were used to exemplify those obtained with chemically modified soybean oil, and along with the products of Example 8 were subjected to the following tests:

| Copolymers | Oil content, percent | Drying time (hrs.) | Pencil hardness (72 hrs.) | 72 hour films exposed to: | | | |
|---|---|---|---|---|---|---|---|
| | | | | Water | 0.5% NaOH soln. | Mineral spirits | Flex over 1/8" mandrel |
| Prepared using chemically modified soybean oils of Ex. 1: | | | | | | | |
| Example 2 | 52.5 | 2.5 | 3B | SH—72 hrs., Rec.—Ex. | SH—5 hrs.; film OK | Film soft but OK at 1 week. Rec.—good. | Pass. |
| Example 4 | 52.5 | 4 | 3B | ___do___ | F—1.5 hrs | ___do___ | Do. |
| Prepared using ordinary refined or heat bodied soybean oils: | | | | | | | |
| Example 8a | 50 | 24 | Less than 6B | VH—24 hrs.; Op—48 hrs. | H—0.5 hr.; F—3 hrs. | F—1 hr | Do. |
| Example 8b | 45 | 4 | 4B | SH—72 hrs.; Rec.—Ex. | VSH—5 hrs.; film OK. | ___do___ | Fail. |
| Example 8c | 40 | 3 | 4B | ___do___ | ___do___ | ___do___ | Do. |

SH=Slight haze; VH=Very hazy; Op=Opaque; Rec.=Recovery; Ex.=Excellent; F=Fail.

From the above table it will be noted that if the oil content of the ordinary or bodied soybean oil copolymers is as much as 50% (Example 8a) the drying properties are very poor, since about 24 hours is required for the film to reach the dry-to-touch state. Similarly, the films are very soft (broken by 6B pencil) even after drying for 72 hours; also the water and alkali resistance are poor. If the oil length be further reduced and more vinyltoluene or divinylbenzene used as in Examples 8b and 8c, the drying times and water resistance of the ordinary soy oil copolymers can be considerably improved; however, they are still inferior with respect to the important properties of film hardness, solvent resistance and flexibility as compared to the longer oil copolymers made using a chemically modified soybean oil in accordance wtih the present invention.

*Example 10*

Since the film properties of the chemically modified soy-vinyltoluene/divinylbenzene copolymers indicated that they would constitute ideal vehicles for interior paints, several such paints of various types were prepared and tested. Since these copolymers had extremely high solution viscosities (indicating high molecular weights in the copolymers) they were investigated primarily as vehicles for interior flat wall paints where nonpenetration into porous surfaces is of the utmost importance. However, other tests indicated utility in interior gloss enamels and industrial finishes as well. Typical data for two interior flat formulations are given below:

| Type of paint | Vehicle | Percent N.V. in paint vehicle | Thinner | Viscosity stability (N.V.) | | Brush | Level | Hold out | Washability |
|---|---|---|---|---|---|---|---|---|---|
| | | | | 1 day | 1 mo. | | | | |
| Interior flat | Example 2 | 32.2 | Low odor mineral spirits | 86 | 92 | Good | Ex | Good | Ex. |
| Do | Example 6 | 32.7 | ___do___ | 88 | 86 | Ex | Ex | ___do___ | Ex. |

These interior flat pains were found to be fast drying (about 1 hour) and were recoatable without lifting within three hours. They had very little odor during drying, and when painted in closed test rooms showed very little "painty" oxidation odor after one to three days. Further testing showed these products yielded finishes which were nonyellowing in the dark. Because of their excellent nonpenetration characteristics, one coat systems over porous surfaces were found quite feasible. Brushing and other working characteristics were found superior to commercial paints, particularly with respect to wet edge retention.

When formulated in typical titanium dioxide pigmented interior gloss finishes the copolymers of the present invention yielded excellent gloss and color retention, fast dry, and good working properties.

On the other hand, paints formulated with the copolymers of Example 8, in which the modifying oil was ordinary or heat bodied soybean oil, were found to be seriously deficient in one or more properties. For example, paints made using the copolymer of Example 8a were very slow drying and yielded soft films with poor chemical resistance. Paints formulated using the copolymers of Example 8b or c were found to be too brittle and to lack adhesion.

In summary, therefore, the invention comprises heating 40 to 60 parts by weight of a modified soybean oil as herein defined, in the range of 300° F. to 500° F., and in the presence of an organic peroxide catalyst, with a vinyl monomer, vinyltoluene, until copolymerization occurs, the vinyl monomer being present in amount 60 to 40 parts by weight. The vinyl monomer is vinyltoluene alone or vinyltoluene mixed with up to about 15% of divinylbenzene based upon the weight of vinyltoluene.

What is claimed is:

1. The method of improving the film forming characteristics of soy bean oil which comprises first heating the oil at a temperature of 400° F. to 500° F. with from 1% to 7% of pentaerythritol, on the weight of the oil, until alcoholysis is effected, adding a like amount of maleic anhydride to the mixture, heating being continued at a temperature of above about 500° F. to modify the oil and until an oil of low acid number and a Gardner-Holdt viscosity in the range of about H to Z2 is produced and thereafter heating 60 to 40 parts by weight of such modified oil in the range 300° F. to 600° F. with 40 to 60 parts by weight of vinyl toluene in the presence of a catalytic amount of an organic peroxide until copolymerization is effected and a fast drying oil produced.

2. The process of claim 1 wherein a portion of the vinyl toluene is replaced by a quantity not exceeding 15% of divinylbenzene.

References Cited in the file of this patent

UNITED STATES PATENTS

| | | |
|---|---|---|
| 2,495,458 | Kanning et al. | Jan. 24, 1950 |
| 2,559,466 | Root | July 3, 1951 |
| 2,647,092 | Meeske et al. | July 28, 1953 |

UNITED STATES PATENT OFFICE
CERTIFICATE OF CORRECTION

Patent No. 2,912,396                          November 10, 1959

Alexander Schwarcman

It is hereby certified that error appears in the printed specification of the above numbered patent requiring correction and that the said Letters Patent should read as corrected below.

Column 5, line 62, for "pains" read -- paints --; column 6, line 56, in the table, the heading to column 4 thereof, for "Tinner" read -- Thinner --.

Signed and sealed this 17th day of May 1960.

(SEAL)
Attest:

KARL H. AXLINE
Attesting Officer

ROBERT C. WATSON
Commissioner of Patents